US 8,312,081 B2

(12) United States Patent
Yuan et al.

(10) Patent No.: US 8,312,081 B2
(45) Date of Patent: *Nov. 13, 2012

(54) METHODS AND APPARATUSES FOR RECORDING AND VIEWING A COLLABORATION SESSION

(75) Inventors: Zheng Yuan, San Jose, CA (US); David Knight, San Jose, CA (US); Rohit Deep, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/094,611

(22) Filed: Apr. 26, 2011

(65) Prior Publication Data

US 2011/0202599 A1   Aug. 18, 2011

Related U.S. Application Data

(63) Continuation of application No. 11/753,169, filed on May 24, 2007, now Pat. No. 7,945,621, which is a continuation-in-part of application No. 11/324,044, filed on Dec. 29, 2005.

(60) Provisional application No. 60/695,716, filed on Jun. 29, 2005.

(51) Int. Cl.
*G06F 15/16* (2006.01)

(52) U.S. Cl. ............... 709/204; 709/205; 379/202

(58) Field of Classification Search ............ 709/204, 709/205; 379/202

See application file for complete search history.

(56) References Cited

U.S. PATENT DOCUMENTS

| | | | |
|---|---|---|---|
| 5,786,814 A | 7/1998 | Moran et al. | |
| 6,138,139 A | 10/2000 | Beck et al. | |
| 6,295,551 B1 | 9/2001 | Roberts et al. | |
| 6,332,122 B1 | 12/2001 | Ortega et al. | |
| 6,418,543 B1 | 7/2002 | Goli et al. | |
| 6,484,315 B1 | 11/2002 | Ziese | |
| 6,567,813 B1 | 5/2003 | Zhu et al. | |
| 6,601,087 B1 | 7/2003 | Zhu et al. | |
| 6,636,238 B1 | 10/2003 | Amir et al. | |
| 6,654,032 B1 | 11/2003 | Zhu et al. | |
| 6,675,216 B1 | 1/2004 | Quatrano et al. | |
| 6,687,671 B2 | 2/2004 | Gudorf et al. | |
| 6,691,154 B1 | 2/2004 | Zhu et al. | |
| 6,708,324 B1 | 3/2004 | Solloway et al. | |
| 6,748,420 B1 * | 6/2004 | Quatrano et al. | 709/205 |
| 6,754,631 B1 | 6/2004 | Din | |

(Continued)

OTHER PUBLICATIONS

U.S. Appl. No. 60/695,716, filed Jun. 29, 2005, Yuan.

(Continued)

*Primary Examiner* — Tesfay Yohannes (57) ABSTRACT

In one embodiment, a collaboration session is maintained among a plurality of participant devices, at least one participant device operating as a presenter device that shares content during the collaboration session. Content shared during the collaboration session is recorded. A request is detected during the collaboration session from a particular participant device of the plurality of participant devices to view at least a portion of the recorded content. In response to the request during the collaboration from the particular participant device to view the at least a portion of the recorded content, the at least a portion of the recorded content is played back while the collaboration session is still ongoing, wherein the particular participant device remains an active participant in the ongoing collaboration session during playback of the at least a portion of the recorded content. Eventually, playback of the at least a portion of the recorded content is ceased.

17 Claims, 9 Drawing Sheets

U.S. PATENT DOCUMENTS

| | | | |
|---|---|---|---|
| 6,816,858 B1 | 11/2004 | Coden et al. | |
| 6,901,448 B2 | 5/2005 | Zhu et al. | |
| 6,925,645 B2 | 8/2005 | Zhu et al. | |
| 6,934,766 B1 | 8/2005 | Russell | |
| 7,039,585 B2 | 5/2006 | Wilmot et al. | |
| 7,047,192 B2 | 5/2006 | Poirier | |
| 7,213,051 B2 | 5/2007 | Zhu et al. | |
| 7,224,847 B2 | 5/2007 | Zhang et al. | |
| 7,248,684 B2 | 7/2007 | Caspi | |
| 7,257,769 B2 | 8/2007 | Caspi | |
| 7,260,771 B2 | 8/2007 | Chiu et al. | |
| 7,428,000 B2 | 9/2008 | Cutler et al. | |
| 7,466,334 B1 | 12/2008 | Baba | |
| 7,603,273 B2 | 10/2009 | Poirier | |
| 7,653,705 B2 | 1/2010 | Gudipaty et al. | |
| 7,669,127 B2 | 2/2010 | Hull et al. | |
| 7,693,717 B2 | 4/2010 | Kahn et al. | |
| 7,714,222 B2* | 5/2010 | Taub et al. | 84/600 |
| 7,730,030 B1* | 6/2010 | Xu | 707/617 |
| 7,756,923 B2 | 7/2010 | Caspi et al. | |
| 2002/0085030 A1* | 7/2002 | Ghani | 345/751 |
| 2002/0147592 A1 | 10/2002 | Wilmot et al. | |
| 2003/0182375 A1 | 9/2003 | Zhu et al. | |
| 2003/0220973 A1 | 11/2003 | Zhu et al. | |
| 2004/0107270 A1 | 6/2004 | Stephens et al. | |
| 2004/0114746 A1* | 6/2004 | Caspi et al. | 379/202.01 |
| 2004/0143603 A1* | 7/2004 | Kaufmann et al. | 707/104.1 |
| 2004/0143630 A1* | 7/2004 | Kaufmann et al. | 709/205 |
| 2004/0153504 A1* | 8/2004 | Hutchinson et al. | 709/204 |
| 2004/0158586 A1 | 8/2004 | Tsai | |
| 2004/0193428 A1 | 9/2004 | Fruchter et al. | |
| 2004/0250201 A1 | 12/2004 | Caspi | |
| 2006/0010197 A1* | 1/2006 | Ovenden | 709/204 |
| 2006/0100877 A1 | 5/2006 | Zhang et al. | |
| 2006/0150122 A1 | 7/2006 | Hintermeister et al. | |
| 2007/0005697 A1 | 1/2007 | Yuan | |
| 2007/0005699 A1 | 1/2007 | Yuan | |
| 2007/0188901 A1* | 8/2007 | Heckerman et al. | 360/23 |
| 2007/0266304 A1 | 11/2007 | Fletcher et al. | |
| 2008/0133228 A1 | 6/2008 | Rao | |
| 2008/0168140 A1* | 7/2008 | Chen et al. | 709/205 |
| 2008/0183467 A1 | 7/2008 | Yuan et al. | |
| 2009/0177469 A1 | 7/2009 | Findlay | |

OTHER PUBLICATIONS

Geyer et al. "Towards a Smarter Meeting Record-Capture and Access of Meetings Revisited" 2005.

Graham et al. "An Automatic Transcriber of Meetings Utilising Speech Recognition Technology" 2004.

Zschorn et al. "Transcription of Multiple Speakers Using Speaker Dependent Speech Recognition" Sep. 2003.

Cutler et al. "Distributed Meetings: A Meeting Capture and Broadcasting System" 2002.

Rui et al. "PING: A Group-to-Individual Distributed Meeting System" Jul. 2006.

LaLanne et al. "The IM2 Multimodal Meeting Browser Family" 2005.

Wellner et al. "Browsing Recorded Meetings with Ferret" 2005.

Mitchell et al. "Make Virtual Meetings a Reality" 1999.

Chui et al. "LiteMinutes: An Internet-Based System for Multimedia Meeting Minutes" 2001.

Bett et al. "Multimodal Meeting Tracker," in proceedings of RIAO2000, Paris, France, Apr. 2000.

Waibel et al "Meeting Browser: Tracking and Summarizing Meetings," in proceedings of the DARPA Broadcast News Workshop, 1998.

Schultz et al. "The ISL Meeting Room System," Proceedings of the Workshop on Hands-Free Speech Communication (HSC-2001), Kyoto, Japan, Apr. 2001.

Waibel et al. "Advances in Automatic Meeting Record Creation and Access," Proc. Int'l Conf. Acoustics, Speech, and Signal Processing, May 2001.

* cited by examiner

METHODS AND APPARATUSES FOR RECORDING AND VIEWING A COLLABORATION SESSION

RELATED APPLICATION

The present application is a continuation U.S. patent application Ser. No. 11/753,169, filed on May 24, 2007 entitled "Methods and Apparatuses for Recording and Viewing a Collaboration Session", which is incorporated herein by reference.

U.S. patent application Ser. No. 11/753,169 is a continuation-in-part to and claims the benefit of U.S. patent application Ser. No. 11/324,044, filed on Dec. 29, 2005 entitled "Methods and Apparatuses For Recording a Collaboration Session," which is also incorporated herein by reference.

U.S. patent application Ser. No. 11/324,044 claims the benefit of U.S. Provisional Patent Application No. 60/695,716, filed on Jun. 29, 2005, entitled "Methods and Apparatuses For Recording A Collaboration Session."

FIELD OF INVENTION

The present invention relates generally to recording content and, more particularly, to recording content during a collaboration session.

BACKGROUND

There has been an increased use in collaboration sessions that are Internet or web-based to communicate with employees, vendors, and clients. During these collaboration sessions, information is typically exchanged between multiple participants. This exchanged information or content may include audio, graphical, and/or textual information.

SUMMARY

In one embodiment, the systems and methods attend a collaboration session; detect content shared during the collaboration session; automatically record the content and a time stamp corresponding to the content; and play at least a portion of the content during the collaboration session.

BRIEF DESCRIPTION OF THE DRAWINGS

The accompanying drawings, which are incorporated in and constitute a part of this specification, illustrate and explain one embodiment of the methods and apparatuses for recording and viewing a collaboration session. In the drawings.

DETAILED DESCRIPTION

The following detailed description of the methods and apparatuses for recording and viewing a collaboration session refers to the accompanying drawings. The detailed description is not intended to limit the methods and apparatuses for recording and viewing a collaboration session. Instead, the scope of the methods and apparatuses for recording and viewing a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a land line telephone, a cellular telephone, and a device capable of receiving/transmitting an electronic signal.

References to content include audio, video, graphical, and/or textual data.

References to a collaboration session include a plurality of devices that are configured to view content submitted by one of the devices.

References to a participant device include devices that are participating in the collaboration session.

References to a presenter device include a device that is a participant in the collaboration session and shares content shared with other participants.

References to attendee devices include a device that is a participant in the collaboration session and receives content shared by another participant device. The attendee devices are capable of receiving and presenting to users in a user discernable format content that is offered by the presenter device. In some instances, the attendee devices are capable of modifying the content shared by the presenter device.

Figure 1:
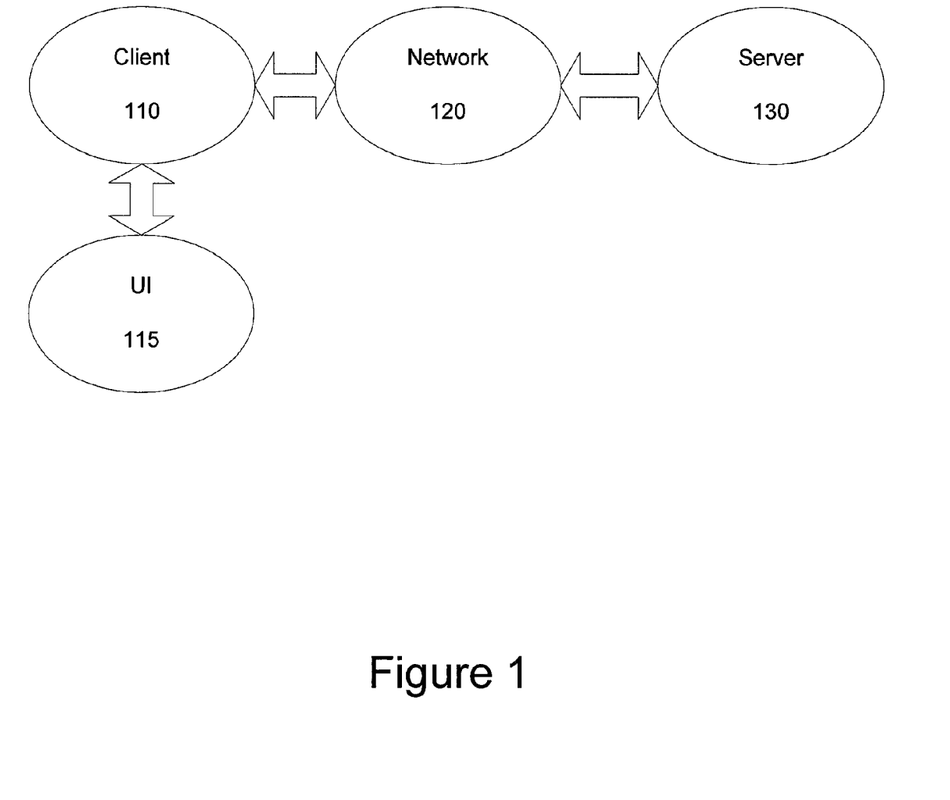
FIG. 1 is a diagram illustrating an environment within which the methods and apparatuses for recording and viewing a collaboration session are implemented.

FIG. 1 is a diagram illustrating an environment within which the methods and apparatuses for recording and viewing a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., a keypad, a video display screen, input and output interfaces, etc., in the same housing such as a personal digital assistant). In other embodiments, one or more user interface 115 components (e.g., a keyboard, a pointing device such as a mouse, a trackball, a microphone, a speaker, a display, a camera, etc.) are physically separate from, and are conventionally coupled to, the electronic device 110. In one embodiment, the user utilizes interface 115 to access and control content and applications stored in electronic device 110, server 130, or a remote storage device (not shown) coupled via network 120.

In accordance with the invention, embodiments of recording and viewing a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
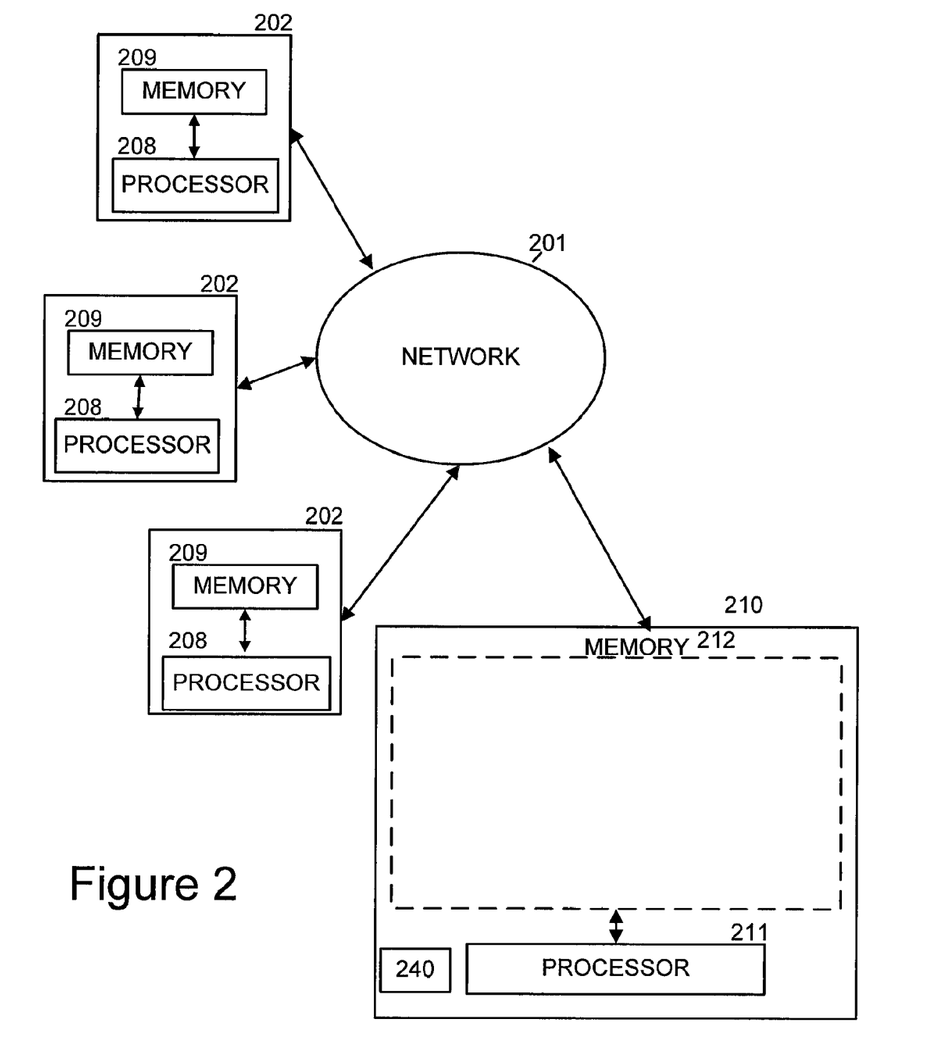
FIG. 2 is a simplified block diagram illustrating one embodiment in which the methods and apparatuses for recording and viewing a collaboration session are implemented.

FIG. 2 is a simplified diagram illustrating an exemplary architecture in which the methods and apparatuses for recording and viewing a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selectively sharing a portion of a display during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on recording and viewing a collaboration session as determined using embodiments described below.

Figure 3:
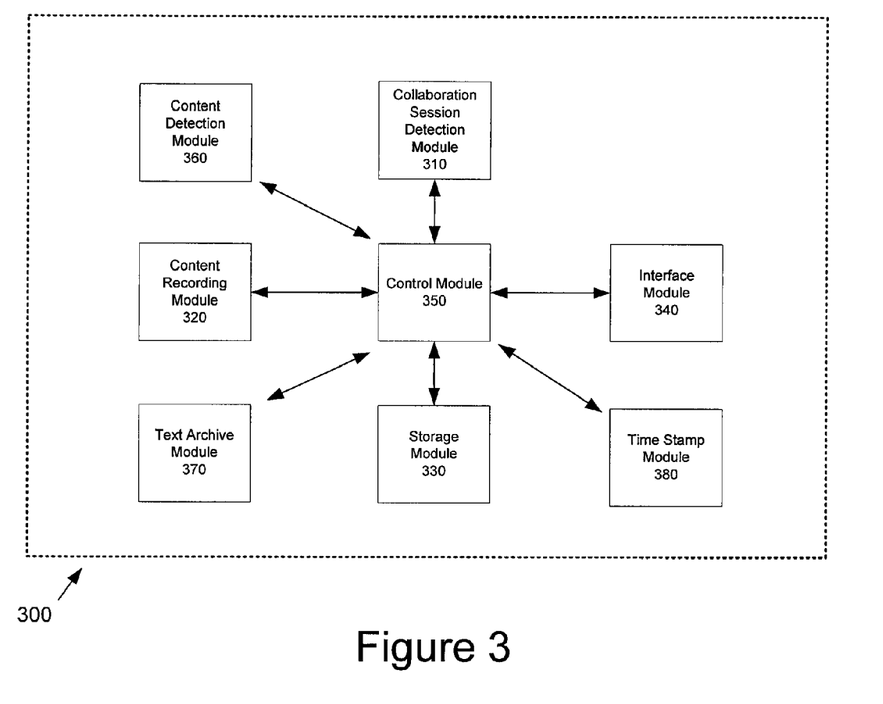
FIG. 3 is a simplified block diagram illustrating a system, consistent with one embodiment of the methods and apparatuses for recording and viewing a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a collaboration session detection module 310, a content recording module 320, a storage module 330, an interface module 340, a control module 350, a text extraction module 360, a text archive module 370, and a time stamp module 380.

In one embodiment, the control module 350 communicates with the collaboration session detection module 310, the content recording module 320, the storage module 330, the interface module 340, the text extraction module 360, the text archive module 370, and the time stamp module 380. In one embodiment, the control module 350 coordinates tasks, requests, and communications between the collaboration session detection module 310, the content recording module 320, the storage module 330, the interface module 340, the text extraction module 360, the text archive module 370, and the time stamp module 380.

In one embodiment, the collaboration detection module 310 detects a collaboration session between multiple participants. In one embodiment, the collaboration session includes sharing content among the participants through a display device. For example, voice and data content may be shared through the display device such as a computer system, a cellular phone, a personal digital assistant, and the like.

Further, the content may include graphical and textual data through word processors, chat windows, documents, and the like.

In one embodiment, the content recording module 320 records the content that is exchanged during the collaboration session.

In one embodiment, the storage module 330 stores the content that is recorded within the content recording module 320. Further, the storage module 330 is also configured to store information corresponding to the participants of the collaboration session.

In one embodiment, the interface detection module 340 detects when the text messages are being transmitted from one of the devices participating in the collaboration session. In another embodiment, the interface detection module 340 monitors the voice transmissions originating from one of the devices participating in the collaboration session. In yet another embodiment, the interface detection module 340 detects any activity by one of the devices participating in the collaboration session.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the content detection module 360 monitors the content that is exchanged between participants within the collaboration session.

In one embodiment, the content detection module 360 detects the different types of content that is exchanged during the collaboration session such as text messages through instant messaging, voice information, application sharing, and the like.

In one embodiment, the text archive module 370 receives the text messages that are transmitted among the participants during the collaboration session and saves them within the storage module 330. In one embodiment, the text archive module 370 formats the individual text messages into a single file and denotes the author of each text message.

In another embodiment, the text archive module 370 receives voice data streams and converts these voice data streams into a textual representation. Further, the text archive module 370 formats the individual textual representations into a single file and denotes the author of each textual representation.

In one embodiment, the time stamp module 380 assigns a time to discrete portions of the content exchanged among the participants during the collaboration session. For example, when the content is text messaging through instant messaging, then the time stamp module 380 assigns a time stamp to each text message transmitted based on the time of transmission. In another example, when content is streamed during the collaboration session, the time stamp module 380 assigns a time stamp to a portion of the streamed content at a predetermined frequency.

In one embodiment, the time stamp corresponds to an actual time of day. In another embodiment, the time stamp corresponds to a time that the collaboration session was initiated.

The system 300 in FIG. 3 is shown for exemplary purposes and is merely one embodiment of the methods and apparatuses for recording and viewing a collaboration session. Additional modules may be added to the system 300 without departing from the scope of the methods and apparatuses for recording and viewing a collaboration session. Similarly, modules may be combined or deleted without departing from the scope of the methods and apparatuses for recording and viewing a collaboration session.

The flow diagrams as depicted in FIGS. 4, 5A, 5B, 5C, and 6 are one embodiment of the methods and apparatuses for recording and viewing a collaboration session. The blocks within the flow diagrams can be performed in a different sequence without departing from the spirit of the methods and apparatuses for recording and viewing a collaboration session. Further, blocks can be deleted, added, or combined without departing from the spirit of the methods and apparatuses for recording and viewing a collaboration session.

Figure 4:
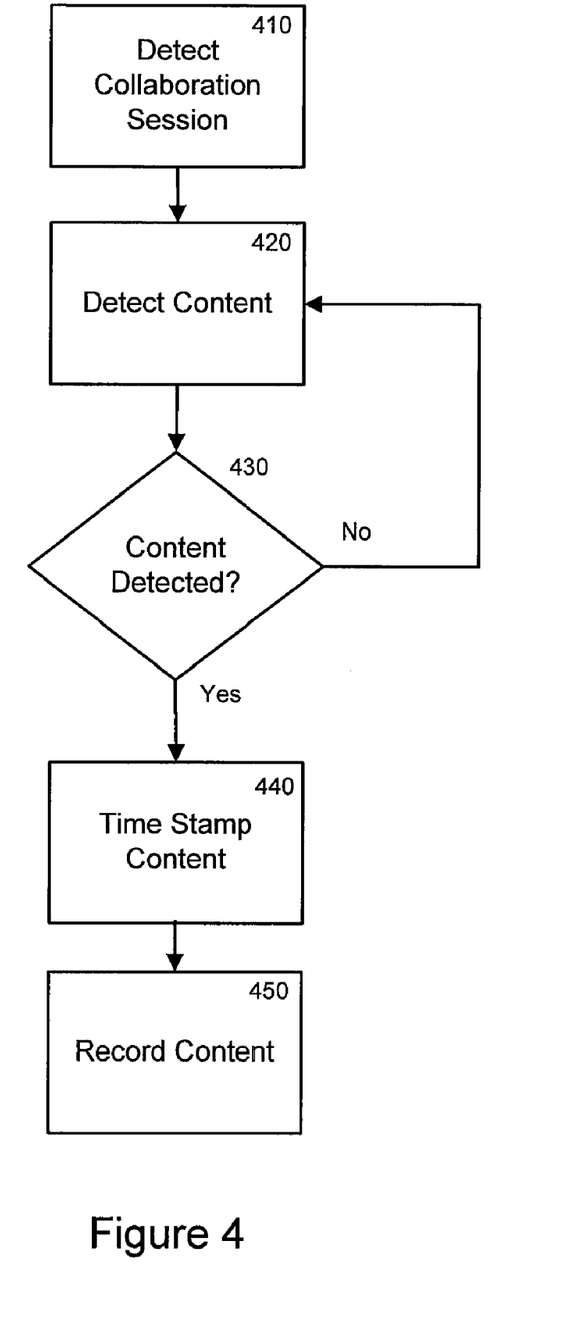
FIG. 4 is a flow diagram consistent with one embodiment of the methods and apparatuses for recording and viewing a collaboration session.

The flow diagram in FIG. 4 illustrates recording and viewing a collaboration session according to one embodiment of the invention.

In Block 410, a collaboration session is detected. In one embodiment, the collaboration session is detected when an attendee device initiates the session. In another embodiment, the collaboration session is detected when an invitee attends the collaboration session. In one embodiment, the collaboration session is detected by the collaboration session detection module 310.

In Block 420, content that is exchanged during the collaboration session is detected. In one embodiment, the content is detected through the content detection module 360. In one embodiment, the content includes documents, applications, voice data, audio data, textual data, graphical data, and the like.

In Block 430, if the content is not detected, then detection continues in the Block 420.

In Block 430, if the content is detected, then the content is time stamped in the Block 440. In one embodiment, the time stamp is applied to the content in the time stamp module 380. In one embodiment, the time stamp indicates a temporal relationship between the content and the collaboration session. For example, if the content is detected towards the beginning of the collaboration session, then the time stamp associated with this content represents a time period towards the beginning of the collaboration session.

In Block 450, the content is recorded with the associated time stamp. In one embodiment, the content recording module 320 records the content and the associated time stamp into the storage module 330.

Figure 5A:
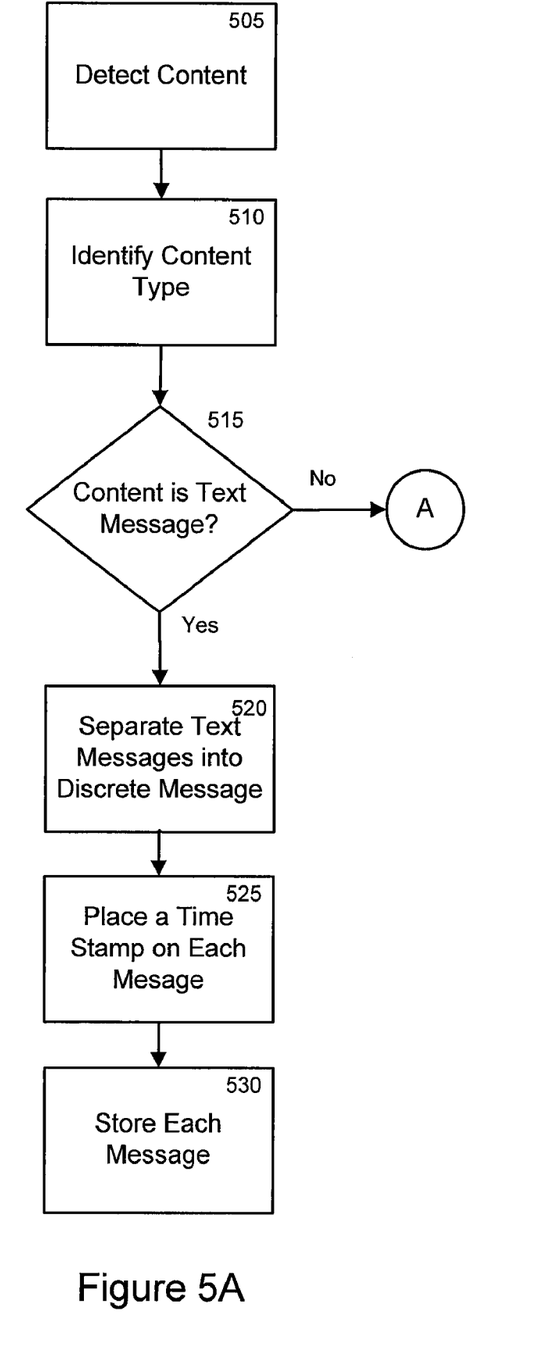
FIGS. 5A, 5B, and 5C are flow diagrams consistent with one embodiment of the methods and apparatuses for recording and viewing a collaboration session.

The flow diagram in FIG. 5A illustrates a method for recording content shared during collaboration session according to one embodiment of the invention.

In Block 505, content that is exchanged during the collaboration session is detected. In one embodiment, the content is detected through the content detection module 360. In one embodiment, the content includes documents, applications, voice data, audio data, textual data, graphical data, and the like.

In Block 510, the content identified in the Block 505 is analyzed to determine the type of the content. For example, the content types include documents, applications, voice data, text messages, and the like.

Figure 5B:
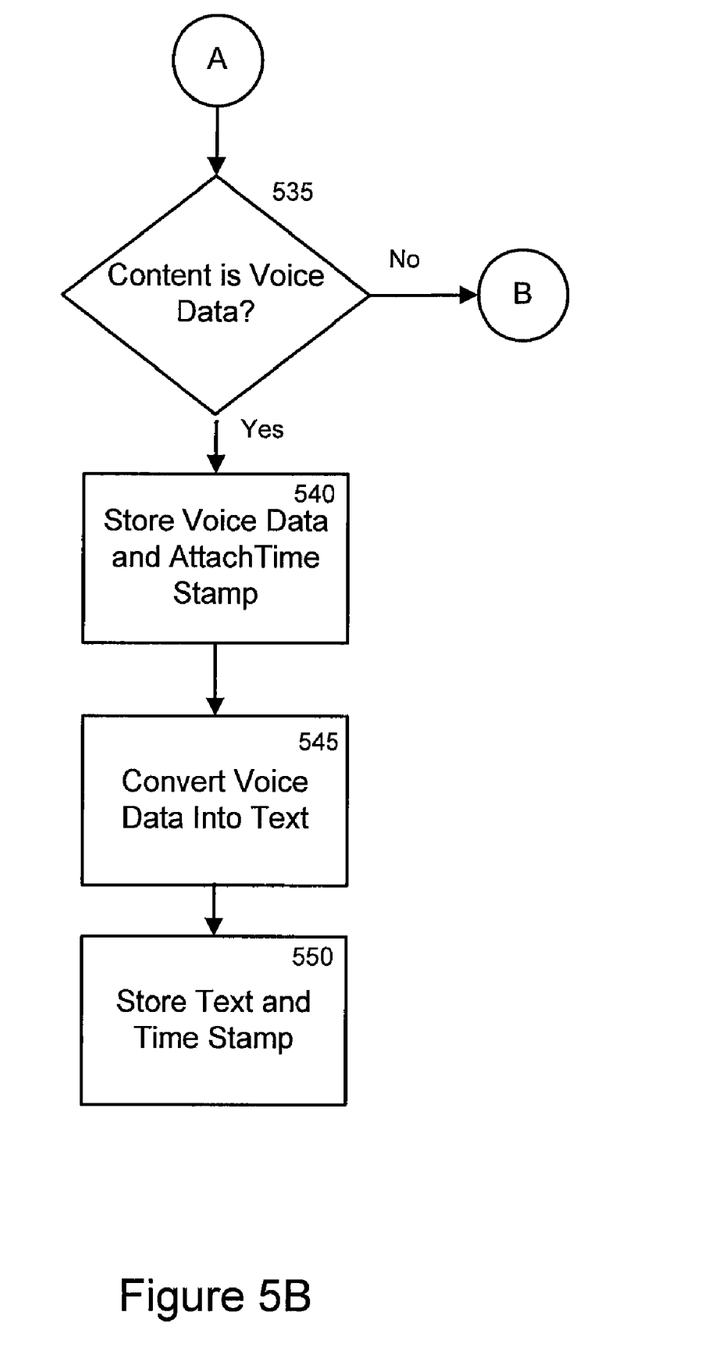

In Block 515, if the content is considered a text message, then the content is further processed in Block 520. If the content is not considered a text message, then the content is further processed in Block 535 (FIG. 5B). In one embodiment, the text message utilizes a SMS format. In another embodiment, the text message is provided by a service known as "Instant Messaging". In yet another embodiment, the text messages are messages containing text and other content in real time from a participant to another participant of the collaboration session.

In the Block 520, in the event that there are multiple text messages, each text message is separated into discrete messages. For example, there can be multiple text messages sent by different or common participants of the collaboration session.

In Block 525, a time stamp is associated with each text message and is utilized to determine when the text message was sent relative to the collaboration session. For example, the time stamp may indicate an actual time of day. In another example, the time stamp may indicate a time count that is relative to the initiation of the collaboration session. In one embodiment, the time stamp module 380 forms the time stamp for each text message.

In Block 530, each of the text messages are stored and archived. In one embodiment, the text archive module 370 combines each of the separate text messages and incorporates the time stamp and the author with each text message. Further, the combined text messages are formatted as a text file in one embodiment.

In one embodiment, all the text messages transmitted within the collaboration session are combined within a single text file. In another embodiment, all the text messages transmitted within the collaboration session are stored in multiple text files.

In one embodiment, the text file is searchable for keywords, authors, time stamps, and the like.

In one embodiment, the text messages are stored in the storage module 330.

The flow diagram in FIG. 5B illustrates a method for recording content shared during collaboration session according to one embodiment of the invention.

Figure 5C:
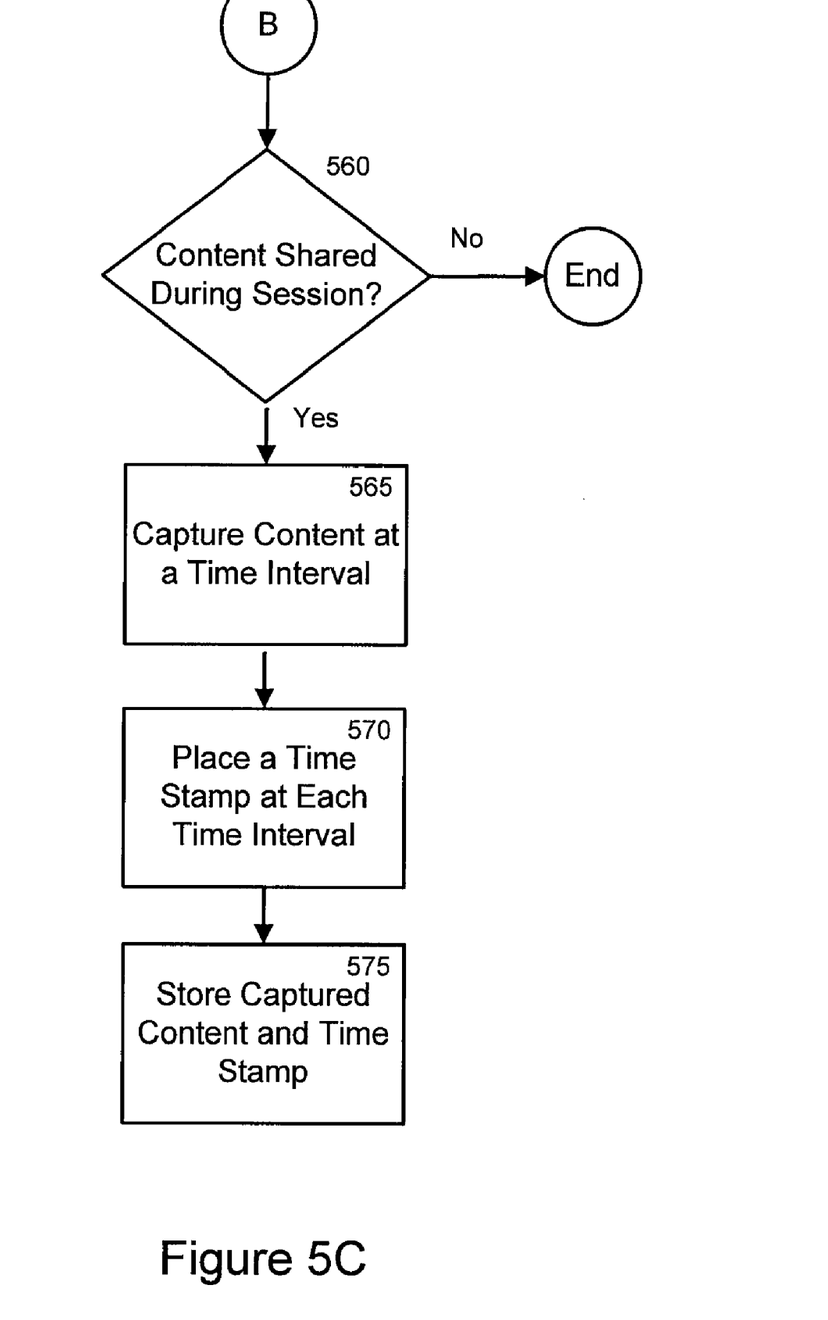

In Block 535, if the content is considered voice data, then the content is further processed in Block 540. If the content is not considered a voice data, then the content is further processed in Block 560 (FIG. 5C). In one embodiment, the voice data is carried over a plain old telephone service (POTS). In another embodiment, the voice data is carried over voice over internet protocol (VoIP). In some instances, the voice data is transmitted among the participants of the collaboration session where the participants utilize a combination of POTS and VoIP services.

In Block 540, a time stamp is periodically attached to the voice data throughout the stream of voice data. In one embodiment, the frequency of the time stamp being attached to the voice data is selectable. For example, the frequency of the time stamp is selected as every second, every 10 seconds, every minute, and the like. In one embodiment, the time stamp is correlated to the timing of the collaboration session. For example, in one embodiment, the time stamp indicates an actual time of day. In another embodiment, the time stamp is relative to the initiation of the collaboration session.

In one embodiment, the voice data and the time stamp(s) are stored within the storage module 330.

In Block 545, the voice data is converted into text data. For example, the voice data stream is detected and converted into text data that represents the voice data stream. In one embodiment, after the conversion of the voice data into the text data, the time stamps are retained and associated with the corresponding text data.

In Block 550, the text data representing the voice data are stored and archived. Further, the time stamps are integrated and stored with the text data in one embodiment. In one embodiment, the text data are stored in the storage module 330.

The flow diagram in FIG. 5e illustrates a method for recording content shared during collaboration session according to one embodiment of the invention.

In Block 560, if the content is shared with one of the participants during the collaboration session, then the content is further processed in Block 565. In one embodiment, the content includes animations, video, documents, applications that are shared during the collaboration session.

In Block 565, the content is captured at a time interval. In one embodiment, the time interval is selected to adequately capture the content. For example, to adequately capture video, the periodic time interval is set to capture at 15 times per second. Further, to adequately capture static documents, the periodic time interval is set to capture at 1 time per second.

In Block 570, a time stamp is attached to the content at each time interval. In one embodiment, the time stamp is correlated to the timing of the collaboration session. For example, in one embodiment, the time stamp indicates an actual time of day. In another embodiment, the time stamp is relative to the initiation of the collaboration session.

In Block 550, the captured content and the associated time stamps are stored and archived. In one embodiment, the captured content and the associated time stamps are stored in the storage module 330.

Figure 6:
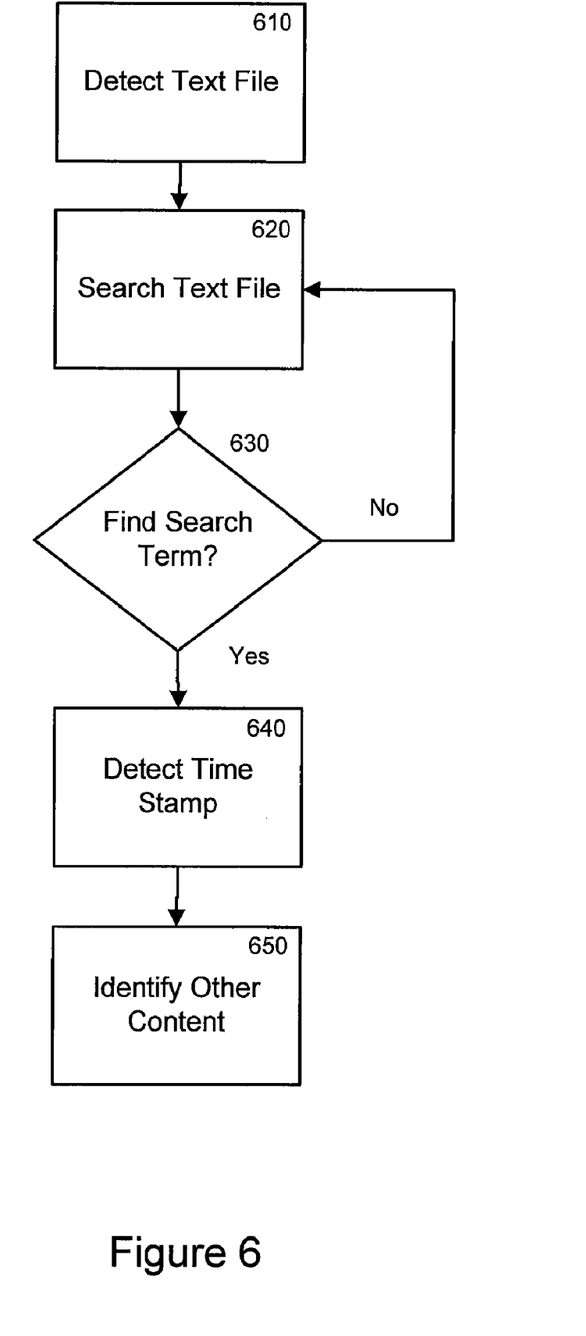
FIG. 6 is a flow diagram consistent with one embodiment of the methods and apparatuses for recording and viewing a collaboration session.

The flow diagram in FIG. 6 illustrates accessing content that was previously recorded during a collaboration session according to one embodiment of the invention.

In Block 610, a text file corresponding to a collaboration session is detected. In one embodiment, the text file represents text messages, voice data, documents, applications that were shared during the collaboration session. In another embodiment, the text file may correspond to multiple collaboration sessions.

In Block 620, a key search term is utilized to search the text file. For example, a search term may include "manager" when the collaboration session pertains to interfacing with customers and resolving customer service issues. By doing a search for the term "manager", a user may be able to search instances during the collaboration session that one of the participants requested assistance from a manager in this example.

In another example, if the collaboration session include participation from a financial institution, key search terms that are searched may include buy, sell, transfer, deposit, withdraw, and the like. In this example, by searching for these terms, a user is capable of identifying instances within the collaboration session that may need further review.

In Block 630, if the searched term is not found, then additional search terms may be utilized in the Block 620.

If the search term is found, then the time stamp associated with the location of the search term within the text file detected in Block 640.

In Block 650, additional content that was shared during the collaboration session is also identified. For example, voice data identified in the Block 535 and shared content identified in the Block 560 that share the detected time stamp from the Block 640 are also identified.

In one embodiment, additional time stamps within a pre-determined amount of time of the time stamp identified in the Block 640 are also identified. Further, shared content that correspond to these additional time stamps are also identified.

In use, if the collaboration session involves a financial institution, the shared content that occurs prior to and after the time stamp associated with a search term is identified. In this example, the shared content prior to and after the search term provides background and context to the specific search term found within the collaboration session. The actual number of time stamps that are identified in the Block 650 prior to and after the search term depends on the frequency of the time stamps.

Although the Blocks 610 and 620 utilize a text file, different types of files can be substituted in other embodiments. For example, a voice data file may be searched within the Block 620 for a key term. Further, once the key term is found within the voice data file, a corresponding time stamp is identified through the Block 540.

Figure 7:
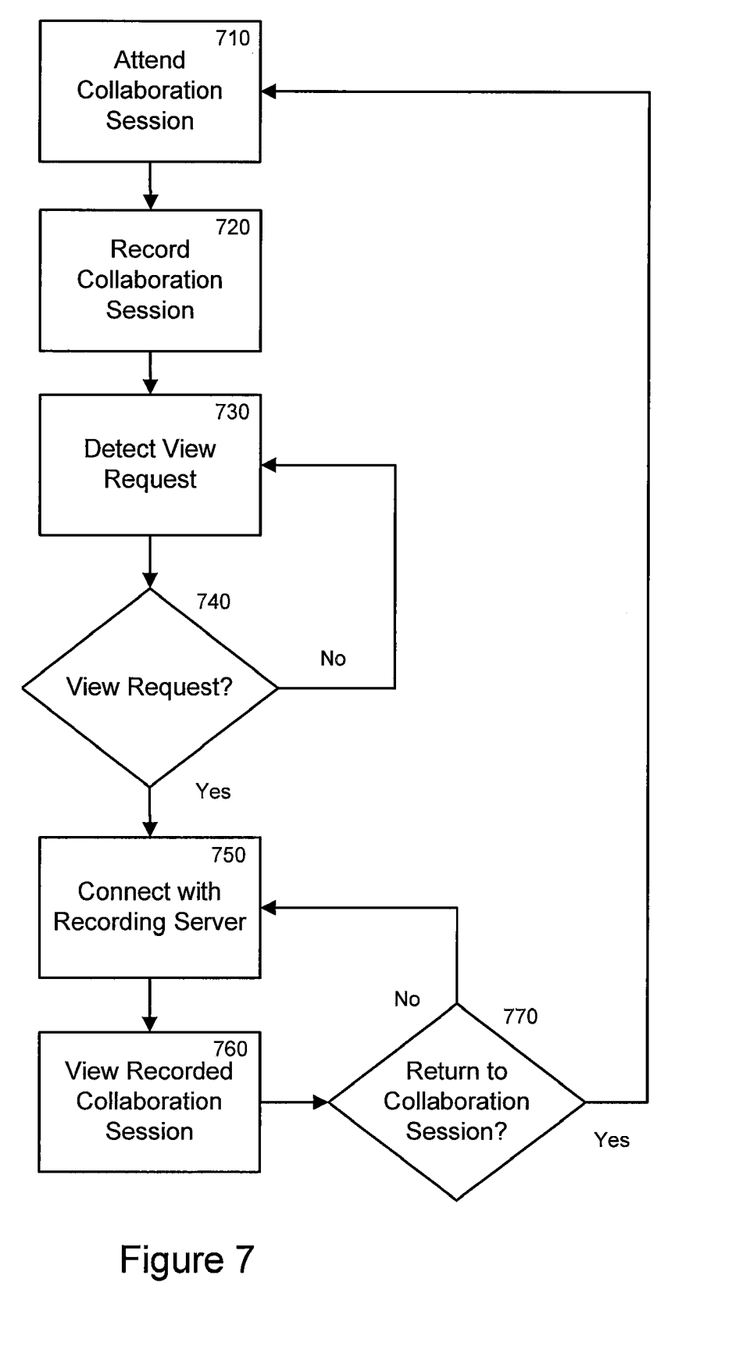
FIG. 7 is a flow diagram consistent with one embodiment of the methods and apparatuses for recording and viewing a collaboration session.

The flow diagram in FIG. 7 illustrates participating in a collaboration session, recording a collaboration session, and viewing the recorded collaboration session while the collaboration session is still being recorded according to one embodiment of the invention.

In Block 710, participants attend a collaboration session. In one embodiment, a server dedicated to the collaboration session coordinates the interaction between participants of the collaboration session.

In Block 720, content shared during the collaboration session are captured and recorded. In one embodiment, a server dedicated to recording the collaboration session captures and records the content shared during the session.

In Block 730, a request to view the recorded content of the collaboration session is detected.

In one embodiment, by having a participant of the collaboration session request to view the recorded content while the collaboration is still taking place, this participant is asking to pause active participation in the current collaboration session. In one embodiment, one of the participants in the collaboration session indicates that the participant wishes to view recorded content of the collaboration session while the collaboration is still taking place. By indicating the desire to view the content of the collaboration session while the collaboration session is still taking place, this participant wished to pause active involvement in the current collaboration session. For example, by having an active participant wanting to view the content of a collaboration session that is currently taking place, this active participant is requesting a pause in active participation of the collaboration session and wishes to view the content of the collaboration session instead.

In another embodiment, one of the participants of the collaboration session requests to view the recorded content of the collaboration session while still participating in the current collaboration session.

In Block 740, if the view request is not detected, then continued monitoring continues within the Block 730. If the view request is detected, then a connection is made with the recording server within Block 750.

In Block 760, the participant that requested to view the recorded content of the collaboration session gains access to the recorded content. In one embodiment, the collaboration session continues as the recorded content is provided to the requesting participant. For example, the amount of recorded content increases as the collaboration session continues.

In one embodiment, the recorded content is streamed to the requesting participant by the recording server. In another embodiment, the requesting participant gains access to the recording server and views the recorded content through the recording server.

In one embodiment, as the requesting participant views the recorded content, the requesting participant is no longer an active participant within the collaboration session. In another embodiment, the requesting participant remains an active participant within the collaboration session while viewing the recorded content.

In one embodiment, the requesting participant is able to pause, rewind, fast forward, and play the recorded content.

In Block 770, the requesting participant may remain connected with the recording server in the Block 750. Further, the requesting participant may not wish to continue viewing the recorded content and may wish to return as an active participant within the collaboration session and return to the Block 710.

In one embodiment, the participant may cycle through and view recorded content from multiple collaboration sessions. In one embodiment, the participant may view recorded content from multiple collaboration session simultaneously. Further, the participant may view recorded content from multiple collaboration sessions while these collaboration session are currently active.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A method comprising:
   maintaining a collaboration session among a plurality of participant devices, at least one participant device of the plurality of participant devices operating as a presenter device that shares content during the collaboration session;
   recording the content shared during the collaboration session;
   assigning one or more time stamps to the recorded content;
   detecting a request during the collaboration session from a particular participant device of the plurality of participant devices to view at least a portion of the recorded content;
   identifying the at least portion of the recorded content based on the one or more time stamps;
   in response to the request during the collaboration session from the particular participant device to view the portion of the recorded content, playing back the portion of the recorded content, based on a selected at least one of the one or more time stamps, while the collaboration session is still ongoing, wherein the particular participant device remains an active participant in the ongoing collaboration session during playback of the portion of the recorded content; and
   ceasing to playback the portion of the recorded content.

2. The method of claim 1, wherein the recording further comprises:
   detecting the content shared during the collaboration session;
   applying time stamps to the content; and
   recording the content in association with the time stamps.

3. The method of claim 1, wherein the content comprises audio shared during the collaboration session.

4. The method of claim 1, wherein the content comprises text messages shared during the collaboration session.

5. The method of claim 1, wherein the content comprises documents or applications shared during the collaboration session.

6. The method of claim 1, further comprising:
   pausing, rewinding or fast forwarding the playback of the at least a portion of the recorded content.

7. The method of claim 1, further comprising:
   recording the recorded content at a recording server.

8. The method of claim 7, wherein the playing back further comprises:
   streaming the recorded content to the particular participant device from the recording server.

9. The method of claim 1, further comprising:
   detecting a request during the collaboration session from the particular participant device to also view recorded content from one or more second collaboration sessions;
   in response to the request during the collaboration from the particular participant device to also view recorded content from one or more second collaboration sessions, also playing back recorded content from the one or more second collaboration sessions while the collaboration session is still ongoing.

10. A method comprising:
    maintaining a first collaboration session among a plurality of participant devices, at least one participant device of the plurality of participant devices operating as a presenter device that shares content during the first collaboration session;
    detecting a request during the first collaboration session from a particular participant device of the plurality of participant devices to view at least a portion of recorded content from multiple collaboration sessions;
    identifying the at least portion of the recorded content based on one or more time stamps assigned to the recorded content;
    in response to the request during the first collaboration session from the particular participant device to view recorded content from multiple sessions, playing back recorded content from the multiple collaboration sessions, based on a selection of at least one of the one or more time stamps previously assigned to the recorded content, while the first collaboration session is still ongoing, wherein the particular participant device remains an active participant in the ongoing collaboration session during playback of the recorded content from the multiple collaboration sessions.

11. The method of claim 10, wherein the first collaboration session is one of the multiple collaboration sessions whose recorded content is played back.

12. The method of claim 10, wherein each of the multiple collaboration sessions are ongoing collaboration sessions.

13. The method of claim 10, further comprising:
    ceasing the playback of recorded content from the multiple collaboration sessions.

14. An apparatus, comprising:
    a processor; and
    a memory configured to store instructions for execution on the processor, the instructions including instructions that when executed are operable to:
    maintain a collaboration session among a plurality of participant devices, at least one participant device of the plurality of participant devices to operate as a presenter device that shares content during the collaboration session,
    record the content shared during the collaboration session,
    assign one or more time stamps to the recorded content;
    detect a request during the collaboration session from a particular participant device to view at least a portion of the recorded content, content, and identify the at least portion of the recorded content based on the one or more time stamps, and in response to the request during the collaboration session from the particular participant device to view the portion of the recorded content, play back the portion of the recorded content, based on a selected at least one of the one or more time stamps, while the collaboration session is still ongoing, wherein the particular participant device remains an active participant in the ongoing collaboration session during playback.

15. The apparatus of claim 14, wherein the instructions to record further comprise instructions that when executed are operable to:

detect the content shared during the collaboration session, apply the one or more time stamps to the content, and record the content in association with the one or more time stamps.

16. The apparatus of claim 14, wherein the instructions to record further comprise instructions that when executed are operable to:

stream the recorded content to the particular participant device.

17. The apparatus of claim 14, wherein the instructions comprise instructions that when executed are operable to:

detect a request during the collaboration session from the particular participant device to also view recorded content from one or more second collaboration sessions, and in response to the request during the collaboration session from the particular participant device to also view recorded content from one or more second collaboration sessions, also play back recorded content from the one or more second collaboration sessions while the collaboration session is still ongoing.

* * * * *